United States Patent
Biswas et al.

(10) Patent No.: US 8,498,346 B2
(45) Date of Patent: *Jul. 30, 2013

(54) MULTI-USER MIMO RECEIVER AND METHOD FOR DECODING SIMULTANEOUS UPLINK TRANSMISSIONS FROM MOBILE STATIONS

(75) Inventors: Ashim Biswas, Karnataka (IN); Lakshmipathi Sondur, Karnataka (IN); Anees A. Sahib, Karnataka (IN); Sean Lawrence, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 744 days.

This patent is subject to a terminal disclaimer.

(21) Appl. No.: 12/251,260

(22) Filed: Oct. 14, 2008

(65) Prior Publication Data
US 2009/0041144 A1   Feb. 12, 2009

Related U.S. Application Data

(63) Continuation of application No. 11/171,643, filed on Jun. 29, 2005, now Pat. No. 7,480,497.

(51) Int. Cl.
*H04L 27/28* (2006.01)

(52) U.S. Cl.
USPC ........... 375/260; 375/316; 375/346; 714/752; 455/39; 455/103; 455/104; 455/146; 455/272; 455/303

(58) Field of Classification Search
USPC ............. 375/260, 316, 346; 714/752; 455/39, 455/103, 104, 146, 272, 303
See application file for complete search history.

(56) References Cited

U.S. PATENT DOCUMENTS

| | | |
|---|---|---|
| 5,274,841 A | 12/1993 | Natarajan et al. |
| 5,818,872 A | 10/1998 | Gupta |
| 5,896,561 A | 4/1999 | Schrader et al. |
| 6,229,799 B1 | 5/2001 | Caillerie et al. |
| 6,504,834 B1 | 1/2003 | Fifield |
| 6,560,209 B1 | 5/2003 | Alamouti et al. |
| 6,847,313 B2 | 1/2005 | Biswas |
| 6,947,505 B2 | 9/2005 | Learned |
| 7,006,530 B2 | 2/2006 | Spinar et al. |
| 7,286,617 B2 | 10/2007 | Vanderperren et al. |
| 7,313,189 B2 | 12/2007 | Yoshida et al. |
| 7,313,203 B2 | 12/2007 | Tubbax et al. |
| 7,324,607 B2 | 1/2008 | Guchhait |

(Continued)

FOREIGN PATENT DOCUMENTS

| | | |
|---|---|---|
| EP | 1107620 A2 | 6/2001 |
| WO | WO-0186993 A1 | 11/2001 |

(Continued)

OTHER PUBLICATIONS

"U.S. Appl. No. 12/190,009, Supplemental Notice of Allowability Mailed Mar. 8, 2010", 3 pgs.

(Continued)

*Primary Examiner* — Leila Malek
(74) *Attorney, Agent, or Firm* — Schwegman, Lundberg & Woessner, P.A.

(57) ABSTRACT

Multicarrier receivers and methods for carrier frequency offset correction and channel estimation for receipt of simultaneous transmissions over a multi-user uplink are generally described herein. Other embodiments may be described and claimed.

12 Claims, 6 Drawing Sheets

U.S. PATENT DOCUMENTS

| | | | |
|---|---|---|---|
| 7,327,800 | B2 | 2/2008 | Oprea et al. |
| 7,352,819 | B2 | 4/2008 | Lakshmipathi et al. |
| 7,426,199 | B2 | 9/2008 | Sondur et al. |
| 7,466,964 | B2 | 12/2008 | Sondur |
| 7,480,497 | B2 | 1/2009 | Biswas et al. |
| 7,693,111 | B2 | 4/2010 | Sondur et al. |
| 7,706,248 | B2 | 4/2010 | Sondur et al. |
| 8,064,528 | B2 * | 11/2011 | Giannakis et al. ............ 375/260 |
| 2002/0181390 | A1 | 12/2002 | Mody et al. |
| 2003/0152022 | A1 | 8/2003 | Hosur |
| 2004/0005010 | A1 | 1/2004 | He et al. |
| 2004/0048584 | A1 | 3/2004 | Vaidyanathan et al. |
| 2005/0058215 | A1 | 3/2005 | Biswas |
| 2005/0111427 | A1 | 5/2005 | Li et al. |
| 2005/0129101 | A1 | 6/2005 | Stephens et al. |
| 2005/0144307 | A1 | 6/2005 | Li et al. |
| 2005/0147115 | A1 | 7/2005 | Li et al. |
| 2005/0195790 | A1 | 9/2005 | Learned et al. |
| 2005/0281241 | A1 | 12/2005 | Webster et al. |
| 2005/0281242 | A1 * | 12/2005 | Sutivong et al. .............. 370/344 |
| 2006/0014494 | A1 | 1/2006 | Vanderperren et al. |
| 2006/0045062 | A1 | 3/2006 | Gorokhov et al. |
| 2006/0045220 | A1 | 3/2006 | Biswas |
| 2006/0120395 | A1 | 6/2006 | Xing et al. |
| 2006/0211441 | A1 * | 9/2006 | Mese et al. .................... 455/522 |
| 2006/0222095 | A1 | 10/2006 | Niu et al. |
| 2007/0002749 | A1 | 1/2007 | Sondur et al. |
| 2007/0002800 | A1 | 1/2007 | Sondur et al. |
| 2007/0004337 | A1 | 1/2007 | Biswas et al. |
| 2007/0004347 | A1 | 1/2007 | Sondur |
| 2007/0104221 | A1 | 5/2007 | Venkatachalam |
| 2007/0142089 | A1 | 6/2007 | Roy et al. |
| 2007/0173203 | A1 | 7/2007 | Fei et al. |
| 2008/0317149 | A1 | 12/2008 | Sondur et al. |

FOREIGN PATENT DOCUMENTS

| | | |
|---|---|---|
| WO | WO-200505323 A1 | 6/2005 |
| WO | WO-2007002805 A1 | 1/2007 |
| WO | WO-2007002924 A1 | 1/2007 |

OTHER PUBLICATIONS

"U.S. Appl. No. 11/172,452, Notice of Allowance mailed Nov. 24, 2009", 6 pgs.

"U.S. Appl. No. 12/190,009 Notice of Allowance Mailed Nov. 10, 2009", 6 pgs.

"U.S. Appl. No. 11/172,452 Office Action mailed Sep. 9, 2009", 11 pgs.

"U.S. Appl. No. 11/172,452 Response filed Nov. 9, 2009 to Final Office Action mailed Sep. 9, 2009", 12 pgs.

"U.S. Appl. No. 11/171,643 Response filed Jun. 9, 2008 to Non-Final Office Action mailed Apr. 14, 2008", 19 pgs.

"U.S. Appl. No. 11/171,643 Non-Final Office Action mailed Apr. 14, 2008", 15 Pgs.

"U.S. Appl. No. 11/172,449 Non-Final Office Action mailed Apr. 9, 2008", 16 pgs.

"U.S. Appl. No. 11/172,449, Notice of Allowance mailed Aug. 11, 2008", 5 pgs.

"U.S. Appl. No. 11/172,451 Notice of Allowance mailed May 9, 2008.", 6 pgs.

"U.S. Appl. No. 11/172,451 Response filed Apr. 10, 2008 to Final Office Action mailed Feb. 29, 2008", 10 pgs.

"U.S. Appl. No. 11/172,451 Response filed Dec. 11, 2007 in response to Non-Final Office Action mailed Oct. 16, 2007", 16 pgs.

"U.S. Appl. No. 11/172,451 Final Office Action mailed Feb. 29, 2008", 10 pgs.

"U.S. Appl. No. 11/171,643 Notice of Allowance Mailed on Sep. 5, 2008", 11 pgs.

"International Search Report for corresponding PCT Application No. PCT/US2006/025305", (Oct. 31, 2006), 3 pgs.

"International Search Report for corresponding PCT Application No. PCT/US2006/025777", (Oct. 27, 2006), 5 pgs.

"Non-Final Office Action Mailed Oct. 16, 2007 in U.S. Appl. No. 11/172,451", OARN, 13.

Biswas, A., et al., "Channel Estimation Techniques With Long Training Sequence for IEEE 802.11A", *2004 International Conference on Signal Processing & Communications(SPCOM '04)*, (2004), 136-139.

Cui, T., et al., "Robust Joint Frequency Offset and Channel Estimation for OFDM Systems", *IEEE 60th Vehicular Technology Conference (VTC 2004-Fall)*, vol. 1., (2004), 603-607.

Egashira, N., et al., "Improvement of CCI Compensation Accuracy Using Feedback Phase Tracking in MIMO-OFDM Systems", *IEEE Global Telecommunications Conference (GLOBECOM '04)*, vol. 2, (2004), 923-927.

Frenkiel, R. H., et al., "The Infostations Challenge: Balancing Cost and Ubiquity in Delivering Wireless Data", *IEEE Personal Communications*, vol. 7, (Apr. 2000), 66-71.

Moose, P. H., "A Technique for Orthogonal Frequency Division Multiplexing Frequency Offset Correction", *IEEE Transactions on Communications*, 42(10), (Oct. 1994), 2908-2914.

Pun, M., et al., "An EM-Based Joint Maximum Likelihood Estimation of Carrier Frequency Offset and Channel for Uplink OFDMA Systems", *IEEE 60th Vehicular Technology Conference (VTC 2004)*, (2004), 598-602.

Yu, C.-Y., et al., "Design and Simulation of a MIMO OFDM Baseband Transceiver for High Throughput Wireless LAN", *Proceedings, 2004 IEEE Asia-Pacific Conference on Circuits and Systems*, vol. 1, (2004), 205-208.

"Chinese Application Serial No. 200680021289.9, Office Action mailed Jul. 20, 2010", 14 pgs.

"German Application Serial No. 112006001585.0, Office Action mailed Mar. 23, 2011", 10 pgs.

Egashira, N., et al., "Improvement of CCI compensation accuracy using feedback phase tracking in MIMO-OFDM systems", IEEE Global Telecommunications Conference, 2004. GLOBECOM '04., (2004), 923-937.

"Chinese Application Serial No. 200680021289.9, Office Action mailed Dec. 31, 2011", 19 pgs.

"Chinese Application Serial No. 200680021289.9, Office Action mailed Jun. 4, 2012", 5 pgs.

"Chinese Application Serial No. 200680021289.9, Office Action mailed Sep. 29, 2012", 7 pgs.

* cited by examiner

MULTI-USER MIMO RECEIVER AND METHOD FOR DECODING SIMULTANEOUS UPLINK TRANSMISSIONS FROM MOBILE STATIONS

CROSS REFERENCE TO RELATED APPLICATIONS

This patent application is a continuation of U.S. patent application Ser. No. 11/171,643, filed on Jun. 29, 2005, now issued as U.S. Pat. No. 7,480,497, which is incorporated herein by reference in its entirety.

This patent application is related to U.S. patent application Ser. No. 11/172,449, filed on Jun. 29, 2005, U.S. patent application Ser. No. 11/172,451, filed on Jun. 29, 2005, and U.S. patent application Ser. No. 11/172,452, filed on Jun. 29, 2005.

TECHNICAL FIELD

Some embodiments of the present invention pertain to multicarrier wireless communications, and some embodiments pertain to channel estimation and carrier frequency offset estimation for in multiple-input multiple-output (MIMO) receivers of wireless local area networks (WLANs).

BACKGROUND

In order to help reduce latency between communications with several transmitting stations, some multicarrier communication stations may desire to receive communications from several transmitting stations concurrently. One difficulty with concurrently receiving multiple spatial streams from different transmitting stations is that each transmitting station uses a different oscillator for generating carrier frequencies. Because the oscillators are not synchronized, each carrier frequency may have a different carrier frequency offset that should be compensated for in the receiving station. Furthermore, the channel between each transmitting station and the receiving station may also exhibit different channel characteristics which should also be taken into account by the receiving station.

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
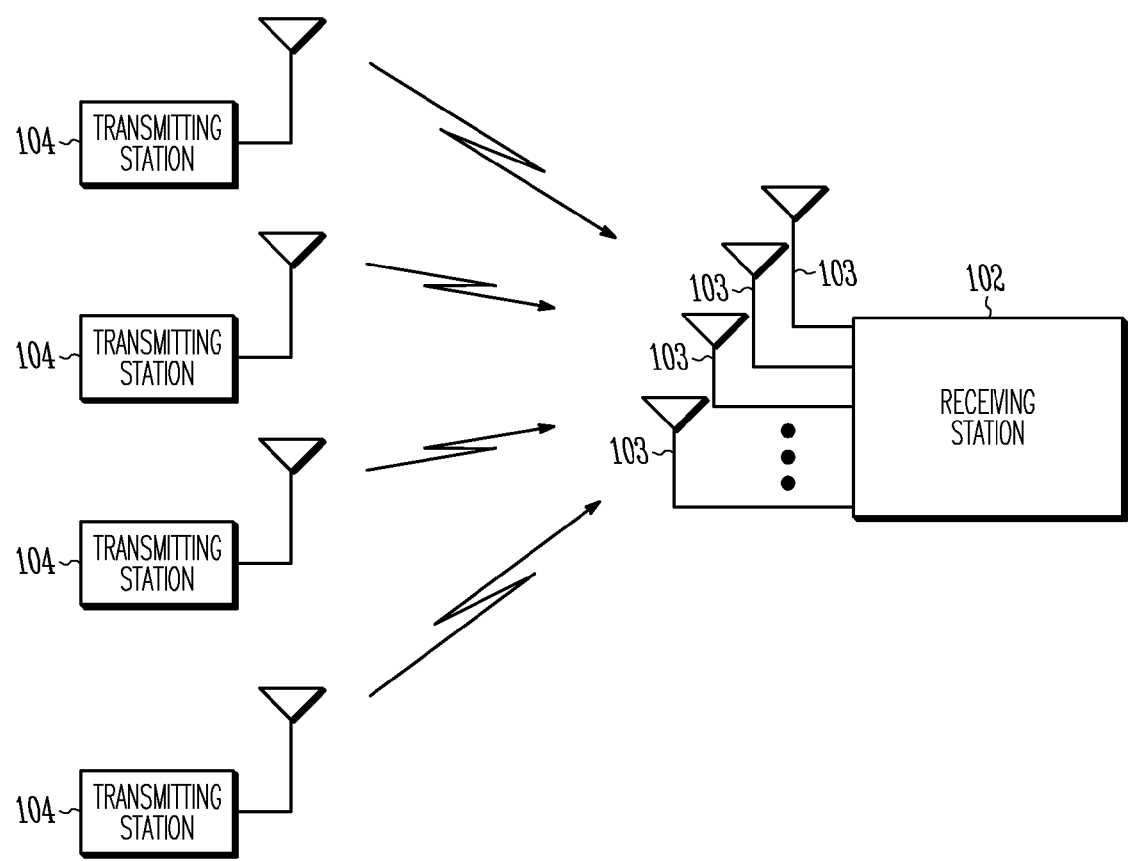
FIG. 1 illustrates a wireless communication network in accordance with some embodiments of the present invention.

FIG. 1 illustrates a wireless communication network in accordance with some embodiments of the present invention. Wireless network 100 comprises receiving station 102 and one or more of a plurality of transmitting stations 104. Receiving station 102 may provide for communications between associated transmitting stations 104 and may allow associated transmitting stations 104 to communicate with one or more external networks, such as the Internet.

In some embodiments, receiving station 102 may be a wireless access point (AP), such as a Wireless Fidelity (WiFi), Worldwide Interoperability for Microwave Access (WiMax), or broadband communication station, although the scope of the invention is not limited in this respect as receiving station 102 may be almost any communication station. In some embodiments, transmitting stations 104 may be communication stations (STAs), such as WiFi, WiMax, or broadband communication stations, although the scope of the invention is not limited in this respect.

In accordance with some embodiments of the present invention, receiving station 102 employs a multi-user uplink with more than one of associated transmitting stations 104. In these embodiments, latency may be reduced for applications operating on selected associated transmitting stations 104. The applications may include time-sensitive applications, such as voice over IP (VoIP) or streamed video applications, which may have time-sensitive packet transmission requirements. In some embodiments, the applications may include applications having quality-of-service (QOS) level requirements. Quality-of-service level requirements may include data rate requirements, error rate requirements and/or packet priority requirements. In some embodiments, the quality-of-service level requirements may be based on the information content of the communications. The applications may also include less time-sensitive applications such applications that communicate best-effort traffic as well as background traffic. Although some embodiments of the present invention are described reducing latency for time-sensitive applications, the scope of the invention is not limited in this respect, as some embodiments are equally applicable to almost any communication application operating on a transmitting station. In some embodiments, time-sensitive applications may refer to any communication application having a packet-latency requirement.

In some embodiments, power consumption of associated communications stations 104 may also be reduced. In some embodiments, receiving station 102 may substantially simultaneously receive uplink data through two or more receive antennas from two or more associated transmitting stations 104 on the same frequency subcarriers of a multicarrier communication channel. In these embodiments, receiving station 102 may internally separate the uplink data transmitted by the two or more associated transmitting stations 104 using channel estimates for each associated transmitting station from which a transmission is received. In some embodiments, receiving station 102 may take advantage of the antenna diversity resulting from differently located associated transmitting stations. These embodiments are discussed in more detail below.

In accordance with some embodiments of the present invention, receiving station 102 receives long and short frequency-interleaved orthogonal training signals that were concurrently transmitted from transmitting stations 104. The training signals are received through each receive antenna 103 of receiving station 102. Receiving station 102 generates channel estimates and carrier frequency offset (CFO) estimates for each of the transmitting stations 104 from the received training signals by performing an iterative decoding process using previously generated channel estimates and previously generated CFO estimates to cancel intercarrier interference (ICI) from the received training signals present due to loss of orthogonality induced by carrier frequency offsets. These embodiments are described in more detail below.

In some embodiments, transmitting stations 104 are polled to simultaneously respond. In some embodiments, each transmitting station 104 may use part of a standard preamble, such as an IEEE 802.11n preamble referenced below, so that transmitting stations 104 together form a virtual MIMO system. Receiving station 102 may have an equal or greater number of antennas 103 than the number of selected transmitting stations 104 to resolve the spatial streams transmitted by each transmitting station. In some of these embodiments, initial CFO estimation is performed during the receipt of a short training field (STF) and CFO correction along with channel estimation is performed during receipt of a long training field (LTF) or preamble. In some of these embodiments, each packet may include the STF, the LTF, a data field and a cyclic prefix, although the scope of the invention is not limited in this respect.

In accordance with some embodiments, $L_{cp}$ may be the cyclic prefix (CP) length, $L_h$ may be the maximum channel length and $\delta_{max}$ may be the maximum delay between the arrival of the first and last packets. The maximum delay should be less than or equal to the length of the cyclic prefix minus the maximum channel length, as illustrated by the following equation:

$$\delta_{max} \leq L_{cp} - L_h.$$

Figure 2:
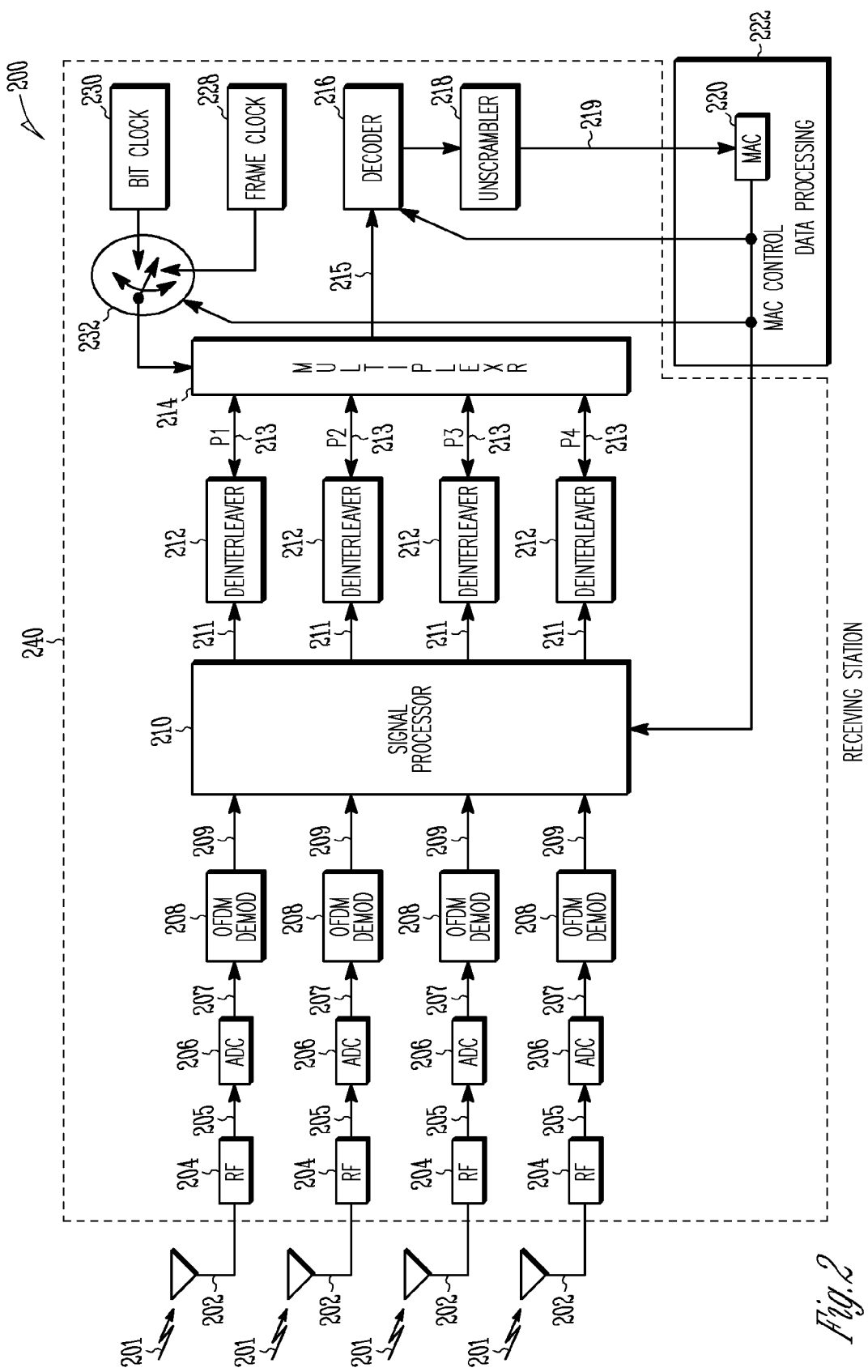
FIG. 2 is a block diagram of a receiving station in accordance with some embodiments of the present invention.

FIG. 2 is a block diagram of a receiving station in accordance with some embodiments of the present invention. Receiving station 200 may correspond to receiving station 102 (FIG. 1), although other configurations may also be suitable. Transmitting stations 104 (FIG. 1) may be similarly configured, although the scope of the invention is not limited in this respect. Receiving station 200 may receive multicarrier communication signals 201, such as orthogonal frequency division multiplexed (OFDM) signals or orthogonal frequency division multiple access (OFDMA) signals, and may generate physical (PHY) layer output data 219 for media access control (MAC) layer 220.

Receiving station 200 may comprise a plurality of receive antennas 202 to receive communications from associated transmitting stations 104 (FIG. 1), radio-frequency (RF) receiver circuitry 204 associated with each of antennas 202 to generate baseband signals 205, and analog-to-digital conversion (ADC) circuitry to generate digital signals 207 associated with each receive antenna 202. Receiving station 200 may also comprise demodulators 208 to generate demodulated signals 209. In some embodiments, demodulators 208 may comprise OFDM demodulators, although the scope of the invention is not limited in this respect.

Receiving station 200 may also comprise signal processor 210 to perform carrier frequency offset (CFO) estimation and channel estimation as discussed in more detail below. Signal processor 210 may also perform an equalization and may demap constellations to frequency-domain symbols for each subcarrier to generate a data stream 211 associated with each transmitting station 104 (FIG. 1). In some embodiments, signal processor 210 may generate channel estimates and carrier frequency offset (CFO) estimates for each of the transmitting stations 104 (FIG. 1) from the received training signals. In some embodiments, signal processor 210 may perform an iterative decoding process using previously generated channel estimates and previously generated CFO estimates to cancel intercarrier interference (ICI) from the received training signals present due to loss of orthogonality induced by carrier frequency offsets. These operations performed by signal processor 210 are described in more detail below.

Receiving station 200 may also comprise deinterleavers 212 to perform deinterleaving operations on bits 211 and multiplexer 214 to multiplex the bits from deinterleavers 212 to generate frames 215 based on boundary information provided by bit clock 230 or frame clock 228. Receiving station 200 may also comprise decoder 216 to decode frames 215, and unscrambler 218 to unscramble the decoded frames to generate PHY layer output data 219, although the scope of the invention is not limited in this respect.

Receiving station 200 includes data processing circuitry 222, which may include MAC layer 220. Data processing circuitry 222 may select a predetermined number of transmitting stations based on a number of receive antennas 202 available to receive communication signals from the transmitting stations over a multi-user uplink discussed in more detail below. In some embodiments, receiving station 200 may use up to four receive antennas 202 for receiving communication signals 201 from up to four associated transmitting stations. In some embodiments, receiving station 200 may use up to ten or more receive antennas 202 for receiving communication signals 201 from up to ten or more associated transmitting stations.

In some embodiments, receiving station 200 may transmit and/or receive OFDM or OFDMA communication signals over a multicarrier communication channel. These multicarrier communication signals may be within a predetermined frequency spectrum and may comprise a plurality of orthogonal subcarriers. In some embodiments, the orthogonal subcarriers may be closely-spaced subcarriers. To help achieve orthogonality between the closely-spaced subcarriers, each subcarrier may have a null at substantially a center frequency of the other subcarriers. In some embodiments, to help achieve orthogonality between the closely-spaced subcarriers, each subcarrier may have an integer number of cycles within a symbol period, although the scope of the invention is not limited in this respect.

In some embodiments, the frequency spectrums for the multicarrier communication signals communicated between receiving station 102 (FIG. 1) and associated transmitting stations 104 (FIG. 1) may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

In some embodiments, receiving station 102 (FIG. 1) and associated transmitting stations 104 (FIG. 1) may transmit and/or receive RF communications in accordance with specific communication standards, such as the Institute of Electrical and Electronics Engineers (IEEE) standards including IEEE 802.11(a), 802.11(b), 802.11(g), 802.11(h) and/or 802.11(n) standards for wireless local area networks (WLANs), although these stations may also be suitable to transmit and/or receive communications in accordance with other techniques, including techniques in accordance with the Task Group N (TGn) Sync (TGnSync) draft proposal for the IEEE 802.11n standard for MIMO WLAN communications. In some broadband and WiMax embodiments, receiving station 102 (FIG. 1) and associated transmitting stations 104 (FIG. 1) may communicate broadband wireless communications in accordance with the IEEE 802.16(e) standards for wireless metropolitan area networks (WMANs), although the scope of the invention is not limited in this respect. For more information with respect to IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments/versions.

In some embodiments, receiving station 102 (FIG. 1) and/or any one or more of associated transmitting stations 104 (FIG. 1) may each be part of a portable communication device, such as personal digital assistant (PDA), a laptop or portable computer with wireless communication capability, a web tablet, a wireless telephone, a wireless headset, a pager, an instant messaging device, a digital camera, a television or other device that may receive and/or transmit information wirelessly.

Antennas 202 may comprise directional or omnidirectional antennas, including, for example, dipole antennas, monopole antennas, patch antennas, loop antennas, microstrip antennas or other types of antennas suitable for reception and/or transmission of RF signals. Although receiving station 200 is illustrated in FIG. 2 as having four antennas 202 and four associated receive signal paths, the scope of the invention is not limited in this respect. In some embodiments, receiving station 200 may have as few as two receive antennas and as many as ten or more receive antennas.

In some embodiments, bit clock 230 may provide bit boundaries to the multiplexer when signal processing circuitry 210 generates data received from a single associated transmitting station 104 (FIG. 1). Switching element 232 may selectively couple either bit clock 230 or frame clock 228 with the multiplexer. Frame clock 228 may be coupled when uplink data is being received substantially simultaneously from two or more selected transmitting stations, while bit clock 230 may be coupled when uplink data is being received at different times from different transmitting stations (i.e., when communicating in a standard mode).

Although receiving station 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of receiving station 200 may refer to one or more processes operating on one or more processing elements.

Figure 3:
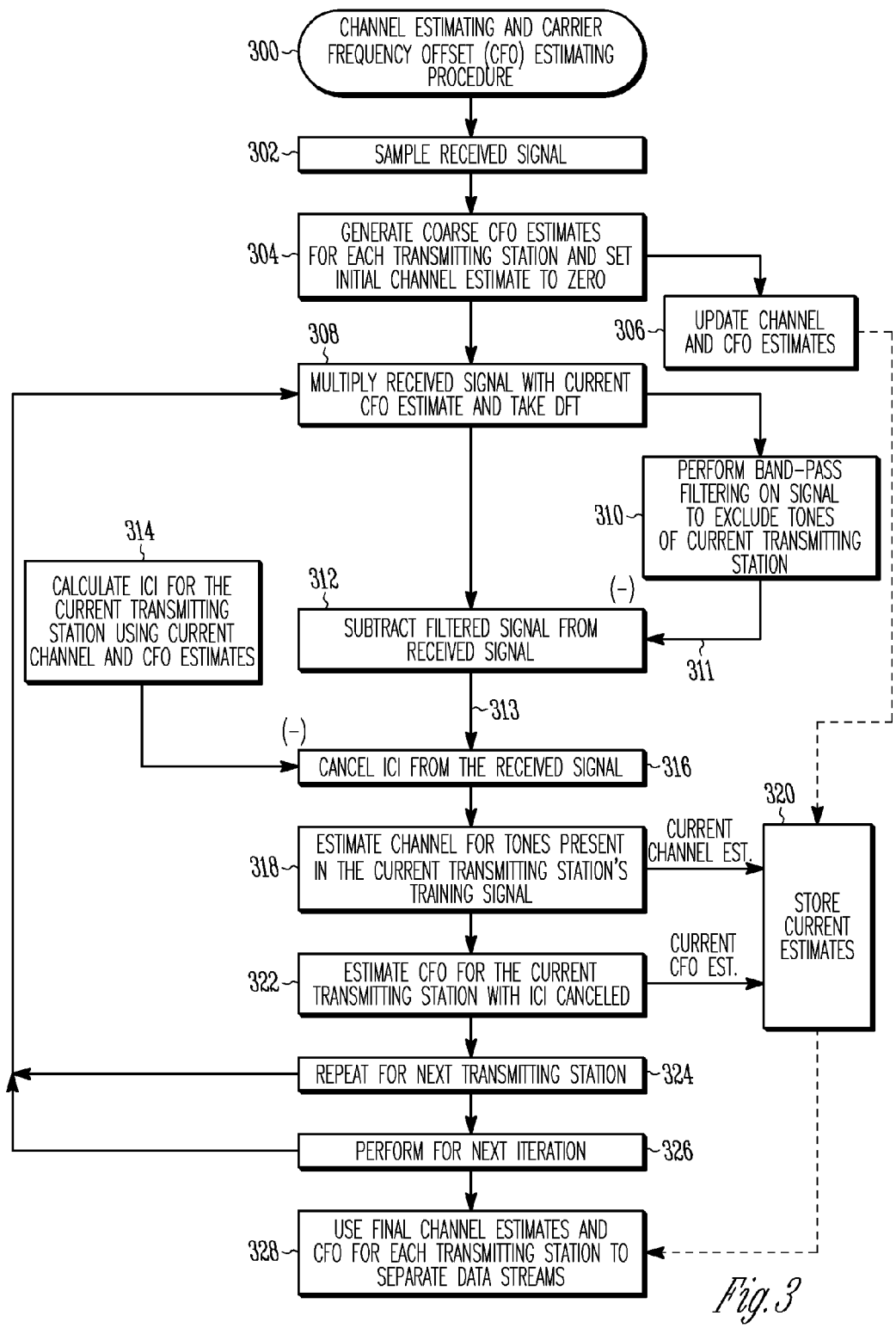
FIG. 3 is a flow chart of an iterative channel estimating and carrier frequency offset estimating procedure in accordance with some embodiments of the present invention.

FIG. 3 is a flow chart of an iterative channel estimating and carrier frequency offset estimating procedure in accordance with some embodiments of the present invention. Iterative channel estimating and carrier frequency offset estimating procedure 300 may be performed by a signal processor of a receiving station to generate carrier frequency offset estimates and channel estimates for each of a plurality of transmitting stations for use in separating data signals transmitted by the transmitting stations. In some embodiments, most operations of iterative channel estimating and carrier frequency offset estimating procedure 300 may be performed by signal processor 210 (FIG. 2) of receiving station 200 (FIG. 2), although other configurations may also be suitable for performing procedure 300. Although the individual operations of procedure 300 are illustrated and described as separate operations, one or more of the individual operations may be performed concurrently, and nothing requires that the operations be performed in the order illustrated.

Operation 302 samples the received signal and the short training signals included therein may be used to generate an initial CFO estimate for each transmitting station in operation 304. The short training signals may be unique to each transmitting station, allowing a receiving station to generate a CFO estimate for each transmitting station. The number of transmitting stations may be less than or equal to the number of antennas used by the receiving station to receive these training signals. Each transmitting station generally uses one antenna to transmit the training signals, although the scope of the invention is not limited in this respect. As part of operation 304, the channel estimates are initially set to zero, and operation 306 comprises storing the initial CFO estimates and channel estimates for each transmitting station.

Operation 308 begins the iterative process in which operations 308 through 322 are performed for each of the transmitting stations for a predetermined number of iterations. Operation 308 comprises multiplying the long-training signals of a received signal by the initial CFO estimate for the first transmitting station and taking a discrete Fourier transform (DFT).

Operation 310 comprises band-pass filtering the signal to exclude tones of the current transmitting station to generate filtered signal 311. Operation 312 comprises subtracting resultant filtered signal 311 from the received signal. Operations 310 and 312 may be performed on a set of frequency-domain samples generated by the DFT of the LTS.

Operation 314 comprises calculating the ICI for the current transmitting station using the current channel estimates and CFO estimates for the current transmitting station and operation 316 comprises subtracting the ICI from the signal generated by operation 312 to at least in part, cancel the ICI. The result of operation 316 is a frequency-domain signal from the current transmitting station with reduced ICI. During each iteration, additional ICI may be cancelled.

Operation 318 comprises estimating the channel based on the tones (i.e., subcarriers) present in the current transmitting station's training signals, which are known. Operation 320 comprises storing the updated channel estimates for subsequent use by operation 314 during the next iteration.

Operation 322 comprises estimating the CFO for the current transmitting station based on the signals generated in operation 316. Operation 320 comprises updating the CFO estimate for the current transmitting station for subsequent use by operation 314 during the next iteration.

Operation 324 comprises repeating operations 308 through 322 for the next transmitting station using the current channel estimate and CFO estimate for the next transmitting station.

Upon the initial completion of operation 324, channel estimates and CFO estimates result for each transmitting station based on a first iteration.

Operation 326 repeats operations 308 through 324 for a predetermined number of iterations. In some embodiments, the number of iterations may depend on whether the CFOs are closely-spaced (e.g., CFOs ranging from −20 KHz to +20 KHz) or whether the CFOs are widely-spaced CFOs (e.g., CFOs ranging from +50 KHz to −50 KHz). More iterations may be selected for widely-spaced CFOs, although the scope of the invention is not limited in this respect.

Operation 328 comprises using the final CFO estimate and channel estimate for each transmitting station to process data signals for each transmitting station. With sufficient iterations, performance substantially equivalent to a single-input single-output (SISO) channel estimation may be obtained.

Figure 4:
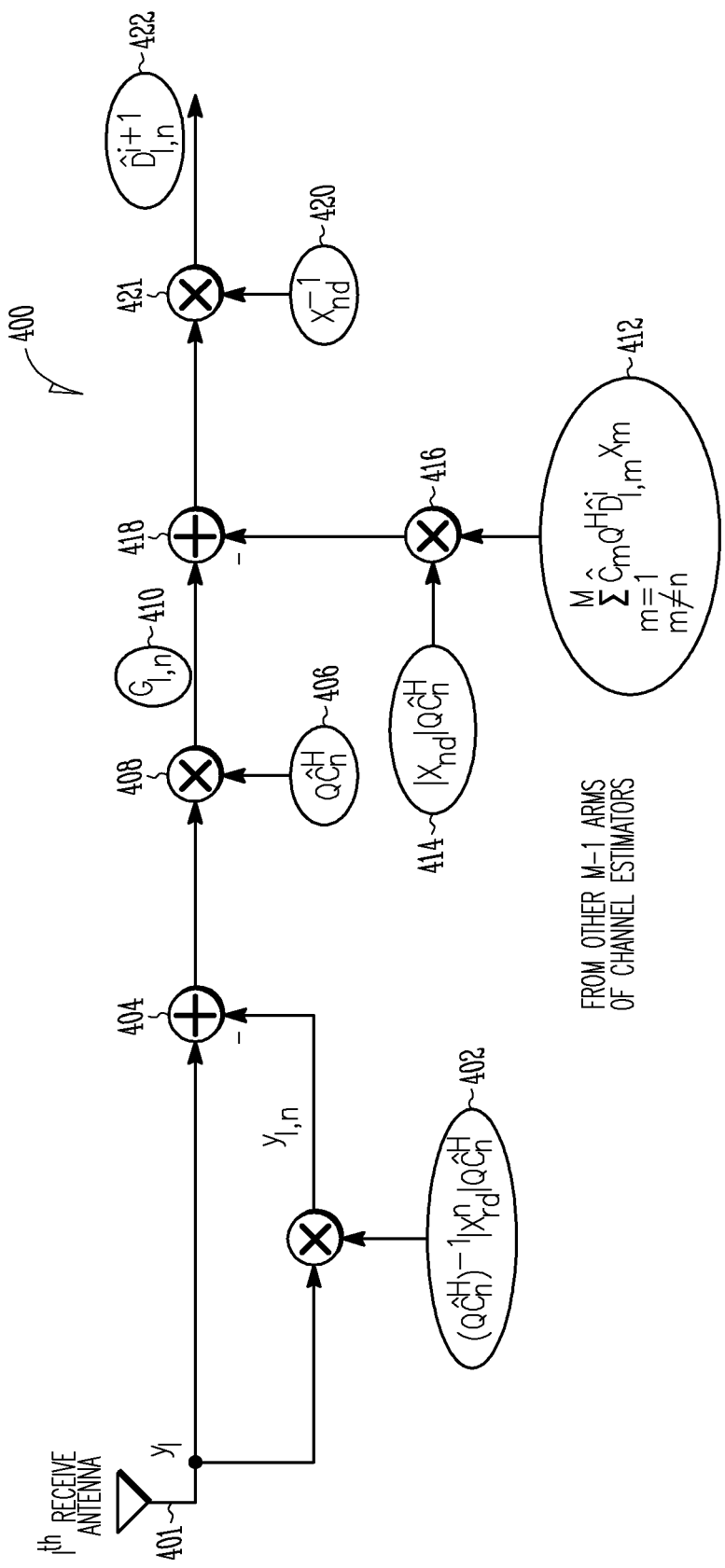
FIG. 4 illustrates the signal processing operations performed for one receive signal path in accordance with some embodiments of the present invention.

FIG. 4 illustrates the signal processing operations performed for one receive signal path in accordance with some embodiments of the present invention. Signal processing operations 400 may correspond to operations performed by signal processor 210 (FIG. 2) for baseband signals 209 (FIG. 2) received through one of RF signal paths. In this example, antenna 401 may correspond to one of antennas 201 (FIG. 2) and signal y1 may correspond to one of baseband signals 209 (FIG. 2).

In this example, mathematical expression 402 represents a band-pass filter matrix for tones excluding the tones transmitted by $n^{th}$ transmitting station and may be generated by operation 310 (FIG. 3). Operation 404 illustrates the generation of a received signal due to the $n^{th}$ transmitting station also corresponding to operation 310 (FIG. 3).

In this example, mathematical expression 406 represents CFO correction and the performance of a DFT and may correspond to operation 308 (FIG. 3). Operation 408 corresponds to operation 312 (FIG. 3).

In this example, mathematical expression 410 represents the output of the channel ($1^{th}$ receiver and $n^{th}$ transmitter) along with the ICI due to other transmitting stations and may correspond to signal 313 (FIG. 3).

In this example, mathematical expression 412 represents the estimated ICI on all the tones corresponding to operation 314 (FIG. 3).

In this example, mathematical expression 414 is a multiplying factor used to extract ICI on the signal represented by mathematical expression 410 from mathematical expression 412. Operation 416 illustrates the canceling of ICI corresponding to operation 316 (FIG. 3).

In this example, mathematical expression 420 represents the inverse of the diagonal matrix of the transmitted signal from the $n^{th}$ transmitting station. Operation 421 represents the generation of the channel estimates corresponding to operation 318 (FIG. 3). In this example, mathematical expression 422 represents the channel estimates of the channel between the $n^{th}$ transmitting station and the $1^{th}$ receiver antenna.

In an example embodiment with M transmitting stations 104 (FIG. 1), the received baseband signal y1 on one of the $1^{th}$ receive antennas of the receiving station may be represented by the following equation:

$$y_l = \sum_{m=1}^{M} C_m H_{l,m} Q^H X_m + \eta_l \quad (1)$$

In this equation, $C_m$=CFO diagonal matrix given by diag(1, $e^{j2\rho T_s \Delta f_m}, e^{j2\rho T_s 2\Delta f_m}, \ldots e^{j2\rho T_s (N-1)\Delta f_m}$); $\Delta f_m$ may represent the CFO of the $m^{th}$ transmitting station with respect to the receiver antenna and $T_s$ is the sampling time. In this equation, $X_m$ represents the long training signals. In some embodiments, the long training signals may correspond to the long training field (LTF) sequence (e.g., a frequency interleaved OFDM symbol) of the $m^{th}$ transmitter transmitted during a preamble, such as a physical layer convergence protocol (PLCP) preamble, although the scope of the invention is not limited in this respect. In some embodiments, $X_m^H X_p = \delta_{mp}$ where $\delta_{mp}=1$ when m=p and $\delta_{mp}=0$ when m≠p. In these embodiments, $X_m$ may comprise +1, −1 and 0 as defined in the IEEE 802.11a/n standards referenced above. In this equation, $Q^H$ may represent an inverse-discrete Fourier transform (IDFT) matrix and $(.)^H$ may denote the conjugate and transpose. In this equation, $H_{l,m}$ may be a circulant matrix representing a time domain fading channel between the $m^{th}$ transmitting station and the $1^{th}$ receiving antenna. The circulant matrix $H_{l,m}$ may alternatively be represented by diagonal matrix $D_{l,m}=QH_{l,m}Q^H$ which may comprise frequency-domain channel coefficients. $\eta_l$ may represent an additive white Gaussian noise vector at the $1^{th}$ antenna.

A diagonal matrix $$X_{rd}^n = \text{diag}\left(\frac{1}{M-1}\sum_{\substack{m=1 \\ m \neq n}}^{M} X_m\right)$$

may be derived from the summation of the orthogonal transmitted vectors except $X_n$. $X_{nd}=I-|X_{rd}^n|$ and $\hat{C}_n$ may be defined to be the estimated CFO for the $n^{th}$ station, and the channel coefficients $D_{l,n}$ may be estimated in accordance with signal processing operations 400. This process is an iterative decoding process in which previous estimates of the channel are used to cancel the intercarrier interference (ICI) present due to loss in orthogonality induced by CFO. FIG. 4 shows only one arm (i.e., the operations for one receive antenna), however the other channel estimates may be derived similarly.

From equation (1) above the $n^{th}$ component may be separated out as shown in equation (2) below:

$$y_l = C_n H_{l,n} Q^H X_n + \sum_{\substack{m=1 \\ m \neq n}}^{M} C_m H_{l,m} Q^H X_m + \eta_l \quad (2)$$

Multiplying both sides of equation (2) by $\hat{C}_n^H$ and taking the DFT may result in:

$$Q\hat{C}_n^H y_l = Q\hat{C}_n^H C_n H_{l,n} Q^H X_n + Q\hat{C}_n^H \sum_{\substack{m=1 \\ m \neq n}}^{M} C_m H_{l,m} Q^H X_m + Q\hat{C}_n^H \eta_l \quad (3)$$

Assuming near perfect CFO estimation $\hat{C}_n^H C_n \approx I$; in which $|\cdot|$ denotes absolute value in the following equations.

$$|X_{rd}^n|Q\hat{C}_n^H y_l = |X_{rd}^n|D_{l,n}X_n + |X_{rd}^n|Q\hat{C}_n^H \sum_{\substack{m=1 \\ m \neq n}}^{M} C_m H_{l,m} Q^H X_m + |X_{rd}^n|Q\hat{C}_n^H \eta_l \quad (4)$$

The first term in the right hand side of the above equation may reduce to zero when $X_l$ and $X_n$ are orthogonal. Therefore equation (4) may reduce to:

$$Y_{l,n} = |X_{rd}^n| Q \hat{C}_n^H y_l \quad (5)$$

$$= |X_{rd}^n| Q \hat{C}_n^H \sum_{\substack{m=1 \\ m \neq n}}^{M} C_m H_{l,m} Q^H X_m + |X_{rd}^n| Q \hat{C}_n^H \eta_l$$

From equations (3) and (5), the following relation may be obtained:

$$G_{l,n} = Q \hat{C}_n^H y_l - Y_{l,n} \quad (6)$$

$$= D_{l,n} X_n + (I - |X_{rd}^n|) Q \hat{C}_n^H \sum_{\substack{m=1 \\ m \neq n}}^{M} C_m H_{l,m} Q^H X_m + (I - |X_{rd}^n|) Q \hat{C}_n^H \eta_l$$

The diagonal matrix $D_{l,n}$ may provide the frequency-domain channel coefficients corresponding to non-zero tones of the $n^{th}$ station's training signals. The second term in equation (6) may represent the ICI due to CFO. Frequency-domain channel estimates for the spatial channel corresponding to the $n^{th}$ station and the $l^{th}$ receiving antenna of receiving station may be estimated as follows:

$$\text{diag}(\hat{D}_{l,n}) = \text{diag}(X_n)^{-1} G_{l,n} \quad (7)$$

$\text{diag}(\hat{D}_{l,n})$ is a vector and $\hat{D}_{l,n}$ is the diagonal matrix. The estimate of equation (7) may be further improved through an iterative process described by equation (8) where $\hat{C}_m$ and $\hat{D}_{l,n}^i$ are known through estimation as described above and i is the iteration number.

$$\text{diag}(\hat{D}_{l,n}^{i+1}) = \text{diag}(X_n)^{-1} \times \left( G_{l,n} - |X_{nd}| Q \hat{C}_n^H \sum_{\substack{m=1 \\ m \neq n}}^{M} \hat{C}_m Q^H \hat{D}_{l,m}^i X_m \right) \quad (8)$$

Matrix $\text{diag}(X_n)$ is a rank-deficient diagonal matrix since it has only a subset (i.e. K/M interleaved tones) of non-zero terms. The zeros are of little concern because those rows don't contribute to $\hat{D}_{l,n}$ so only non-zero terms are inverted while determining the inverse of $\text{diag}(X_n)$.

In some example embodiments which use four transmitting stations and one receiving station, such as an IEEE 802.11n access point, each transmitting station may use a single antenna for transmitting uplink signals; and the preamble portion may comprise a sequence of frequency interleaved orthogonal tones in the form of an LTF. The preambles of the transmitting stations are combined together in the channel to form a high throughput (HT)-WLAN preamble, such as the preamble defined in the Task Group N (TGn) Sync (TGn-Sync) draft proposal for the IEEE 802.11n standard for MIMO WLAN network communications.

Figure 5A:
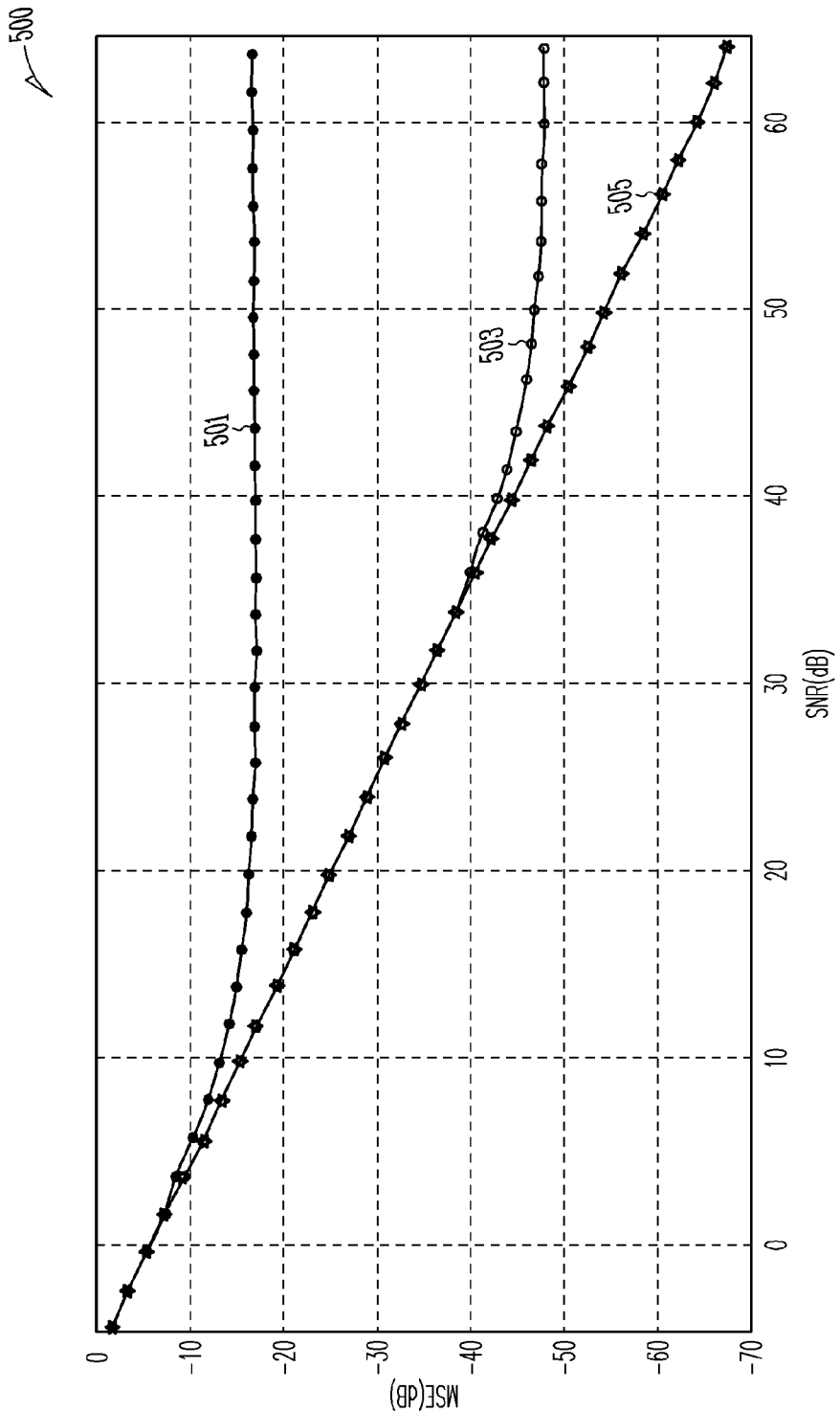
FIGS. 5A and 5B illustrate simulation results of the mean square error (MSE) of the channel estimate against the signal-to-noise ratio (SNR) for different carrier frequency offsets in accordance with some embodiments of the present invention.
Figure 5B:
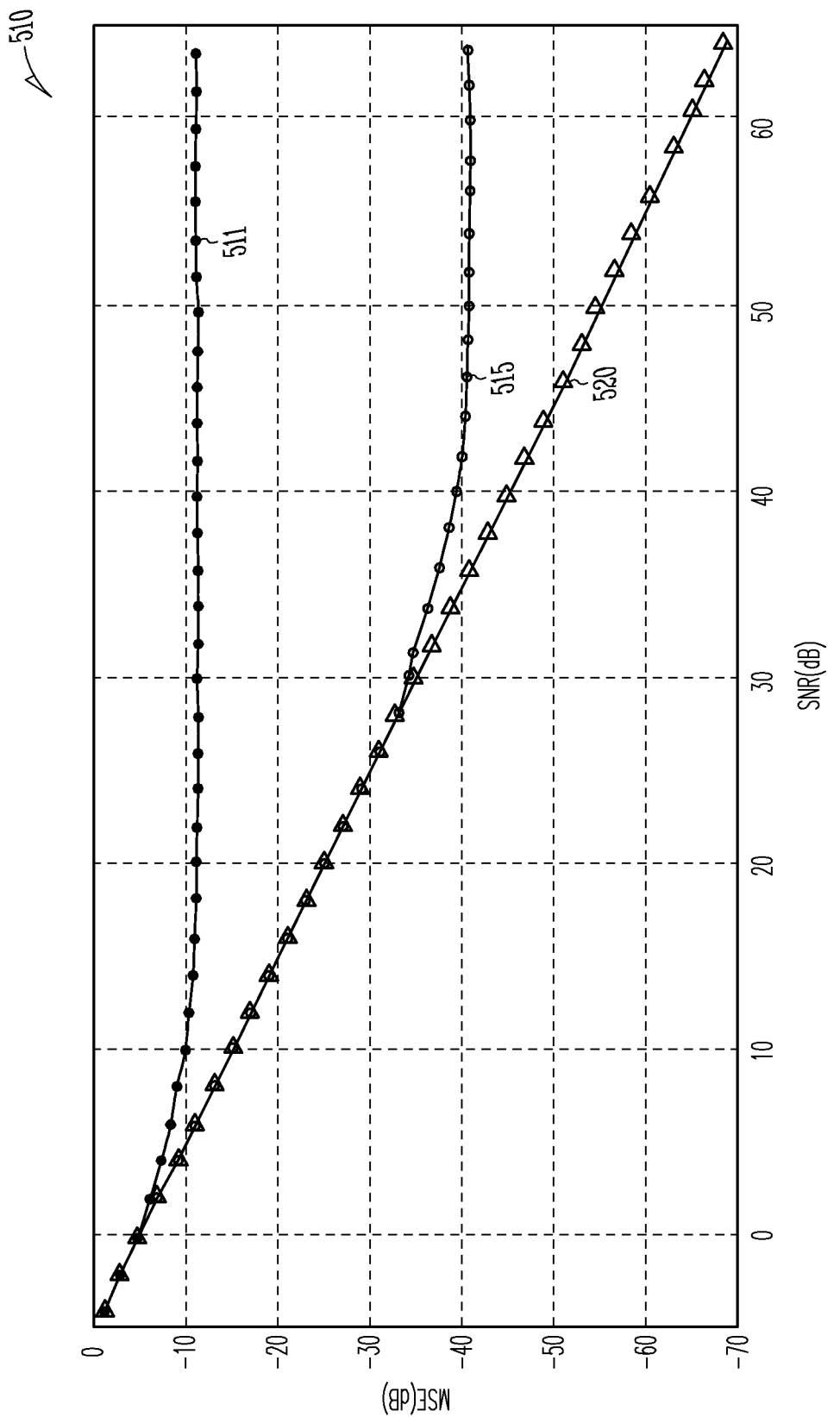

FIGS. 5A and 5B illustrate simulation results of the mean square error (MSE) of the channel estimate against the signal-to-noise ratio (SNR) for different carrier frequency offsets in accordance with some embodiments of the present invention. FIG. 5A shows the channel estimation results 500 for closely-spaced CFOs (e.g., CFOs ranging from −20 KHz to +20 KHz). FIG. 5B shows the channel estimate results 510 for widely-spaced CFOs (e.g., CFOs ranging from +50 KHz to −50 KHz). In FIG. 5A, channel estimation results for one iteration are illustrated by plot 501, channel estimation results for three iterations are illustrated by plot 503, and channel estimation results for five iterations are illustrated by plot 505. In FIG. 5B, channel estimation results for one iteration are illustrated by plot 511, channel estimation results for five iterations are illustrated by plot 515, and channel estimation results for ten iterations are illustrated by plot 520.

In the simulation results illustrated in FIGS. 5A and 5B, the total delay may correspond to (i) packets arrival delays at the receiving station due to different distances of the transmitting station from the receiving station, (ii) PHY-MAC interface delay of each transmitting station, and (iii) the channel spread. The total delay is assumed to be equal or less than the cyclic prefix of an OFDM symbol. FIGS. 5A and 5B illustrate results for a channel delay of 50 ns, which is sometimes found in an office WLAN environment. As illustrated in FIG. 5A, for closely-spaced CFOs, performance substantially equivalent to a single-input single-output (SISO) channel estimation may be obtained within five iterations. As illustrated in FIG. 5B, for widely-spaced CFOs additional iterations (up to ten, for example) may be required to achieve similar performance illustrated in FIG. 5A.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Some embodiments of the present invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features may be occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A method of decoding signals simultaneously received from a plurality of mobile stations at a base station having a plurality of receive antennas, each associated with a receive-signal path, the method comprising:

transmitting signals to the mobile stations by the base station, the signals comprising a plurality of orthogonal frequency subcarriers in accordance with an orthogonal frequency division multiple access (OFDMA) technique;

for each receive-signal path, separately demodulating training signals received from each of the mobile stations;

generating channel estimates for each of a plurality of spatial channels between the mobile stations and the base station based on the separately demodulated training signals;

generating a carrier-frequency offset (CFO) for each of the mobile stations by performing an iterative decoding process that includes removal of portions of the received training signals transmitted by mobile stations other than a current mobile station to generate the CFO for the current mobile station;

concurrently receiving non-orthogonal data signals from the mobile stations over the spatial channels; and applying the channel estimates and the multiple CFOs to the data signals on a station-by-station basis to generate a separate data stream associated with each mobile station, wherein the data signals comprise voice-over-IP (VoIP) corresponding to the separate data streams associated with each mobile station.

2. The method of claim 1 wherein the signals transmitted by the base station include streamed video in accordance with a quality-of-service (QOS) level, and wherein the iterative decoding process uses previously generated channel estimates and previously generated carrier frequency offset estimates to cancel intercarrier interference from the received training signals induced by carrier frequency offsets.

3. A receiver configured to decode signals simultaneously received from a plurality of mobile stations at a base station having a plurality of receive antennas, each associated with a receive-signal path, the receiver being part of a base station configured to transmit signals to the mobile stations using a plurality of orthogonal frequency subcarriers in accordance with an orthogonal frequency division multiple access (OFDMA) technique, the receiver comprising:

demodulation circuitry, associated with each of the receive-signal paths, to separately demodulate training signals received from each of the mobile stations; and signal processing circuitry to generate channel estimates for each of a plurality of spatial channels between the mobile stations and the base station based on the separately demodulated training signals, wherein the receiver is configured to concurrently receive non-orthogonal data signals from the mobile stations over the spatial channels, wherein the signal processing circuitry is configured to generate multiple carrier-frequency offsets (CFOs), each CFO being associated with one of the mobile stations, and apply the channel estimates and the multiple CFOs to the data signals on a station-by-station basis to generate a separate data stream associated with each mobile station, wherein for each mobile station, the CFO estimate is generated by performing an iterative decoding process that includes removal of portions of the received training signals transmitted by mobile stations other than a current mobile station to generate the carrier frequency offset for the current mobile station, and wherein the data signals comprise voice-over-IP (VoIP) corresponding to the separate data streams associated with each mobile station.

4. The receiver of claim 3 wherein the signals transmitted by the base station include streamed video in accordance with a quality-of-service (QOS) level, and wherein the iterative decoding process uses previously generated channel estimates and previously generated carrier frequency offset estimates to cancel intercarrier interference from the received training signals induced by carrier frequency offsets.

5. A multi-user Multiple-Input and Multiple-Output (MIMO) system comprising a base station having a receiver configured to decode signals simultaneously received from a plurality of mobile stations, the receiver comprising:

a plurality of receive-signal paths, each associated with a receive antenna, the base station configured to transmit signals to the mobile stations using a plurality of orthogonal frequency subcarriers in accordance with an orthogonal frequency division multiple access (OFDMA) technique, demodulation circuitry, associated with each of the receive-signal paths, to separately demodulate training signals received from each of the mobile stations; and signal processing circuitry to generate channel estimates for each of a plurality of spatial channels between the mobile stations and each of the receive antennas based on the separately demodulated training signals, the signal processing circuitry to apply the channel estimates to data signals received from the mobile stations through the receive-signal paths to generate a separate data stream associated with each mobile station, wherein each of the mobile stations concurrently transmits the training signals and concurrently transmits the data signals to the base station using at least one orthogonal subcarrier per mobile station, wherein the signal processing circuitry is further configured to generate carrier frequency offset estimates for each of the mobile stations from the separately demodulated training signals by performing an iterative decoding process using previously generated channel estimates and previously generated carrier frequency offset estimates to cancel intercarrier interference from the received training signals induced by carrier frequency offsets, wherein for each mobile station, the iterative decoding process includes removal of portions of the received training signals transmitted by mobile stations other than a current mobile station to generate the carrier frequency offset for the current mobile station.

6. A multi-user (MU) Multiple-Input and Multiple-Output (MIMO) (MU-MIMO) receiver configured to decode signals simultaneously received from a plurality of mobile stations, the receiver comprising:

demodulation circuitry to separately demodulate training signals received from each of the mobile stations; and signal processing circuitry configured to generate carrier frequency offset estimates for each of the mobile stations from the separately demodulated training signals by performing an iterative decoding process using previously generated channel estimates and previously generated carrier-frequency offset (CFO) estimates to cancel intercarrier interference from the received training signals induced by carrier frequency offsets, wherein for each mobile station, the iterative decoding process includes removal of portions of the received training signals transmitted by mobile stations other than a current mobile station to generate the carrier frequency offset for the current mobile station.

7. The MU-MIMO receiver of claim 6 wherein the training signals are uplink training signals based on a known sequence type.

8. The MU-MIMO receiver of claim 7 wherein each of the mobile stations transmits data signals within resource elements to the base station.

9. The MU-MIMO receiver of claim 8 wherein the signal processing circuitry is to apply the channel estimates and the multiple CFOs to the data signals on a station-by-station basis to generate a separate data stream associated with each mobile station.

10. The MU-MIMO receiver of claim 9 wherein the data signals transmitted by the mobile stations comprise voice-over-IP (VoIP) corresponding to the separate data streams associated with each mobile station.

11. The MU-MIMO receiver of claim 9 wherein the receiver is part of a transceiver configured to transmit signals to the mobile stations using a plurality of orthogonal frequency subcarriers in accordance with an orthogonal frequency division multiple access (OFDMA) technique,
  wherein the signals transmitted to the mobile stations in accordance with the OFDMA technique include streamed video in accordance with a quality-of-service (QOS) level.

12. The MU-MIMO receiver of claim 9 further comprising:
  a plurality of receive-signal paths, each associated with a receive antenna, and
  wherein the signal processing circuitry is to generate the channel estimates for each of a plurality of spatial channels between the mobile stations and a base station based on the separately demodulated training signals received through the plurality of receive-signal paths.

* * * * *